July 30, 1957 — J. ROBERTSON, JR — 2,800,754

CUP SHAPED GRINDING WHEEL

Filed Oct. 27, 1955

INVENTOR
JOHN ROBERTSON JR.
BY
ATTORNEY

United States Patent Office 2,800,754
Patented July 30, 1957

2,800,754

CUP SHAPED GRINDING WHEEL

John Robertson, Jr., Shrewsbury, Mass., assignor to Norton Company, Worcester, Mass., a corporation of Massachusetts Application October 27, 1955, Serial No. 543,213

8 Claims. (Cl. 51—209)

The invention relates to cup shaped grinding wheels and contemplates the reinforcement thereof to prevent injury to operators.

One object of the invention is to provide a safe cup shaped grinding wheel whose reinforcement will in no wise interfere with the grinding operation. Another object of the invention is to provide a wheel of the type indicated which can be manufactured very readily.

Figure 1:
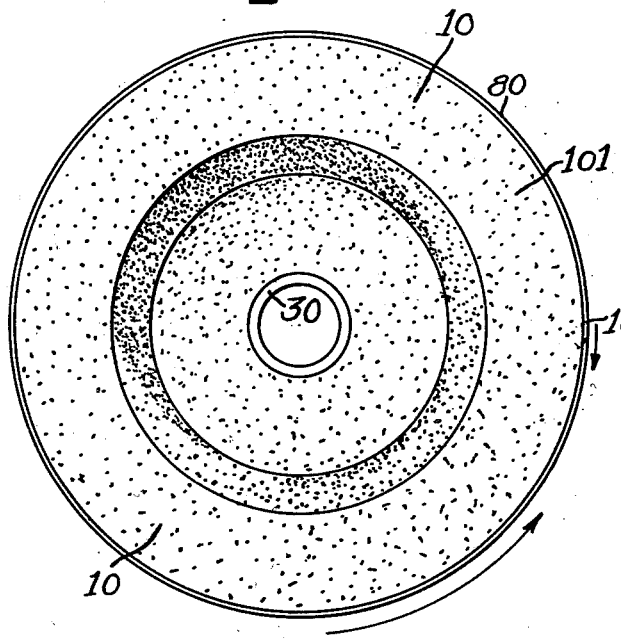
Figure 2:
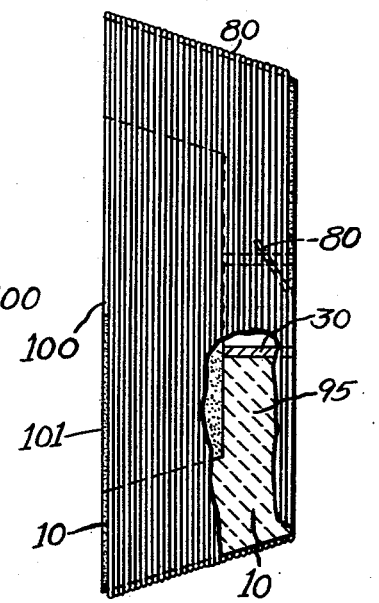
Figure 4:
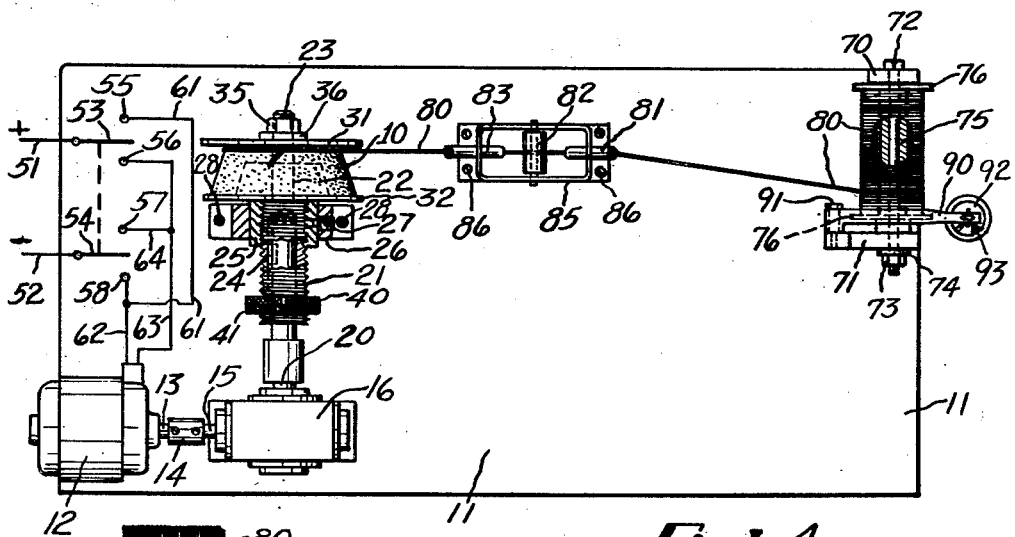
Figure 3:
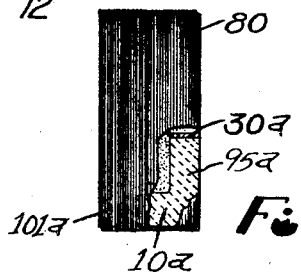

In the accompanying drawings,

Figure 1 is a front elevation of a taper cup wheel constructed in accordance with the invention, Figure 2 is a side elevation of the wheel of Figure 1 showing a portion thereof in section, Figure 3 is a side elevation of a straight cup wheel constructed in accordance with the invention, also showing a portion thereof in section, Figure 4 is a plan view of apparatus for manufacturing the wheels.

The invention can be embodied in grinding wheels of any composition. The manufacture of grinding wheels is a well understood art and need not be described herein. Referring to Figures 1 and 2, I procure a taper cup wheel 10, such wheels having the general shape indicated.

Referring now to Figure 4, apparatus which may be utilized for manufacturing the complete wheel is illustrated therein. Any suitable base 11 mounts an electric motor 12 the output shaft 13 of which is coupled by a coupling 14 to the input shaft 15 of a reducing gearing 16 which is also secured to the base 11.

The output shaft 20 of the reducing gearing 16 has mounted thereon a hollow screw shaft 21 which has a reduced portion 22 with a threaded end 23. The hollow screw shaft 21 is keyed to the output shaft 20 by means of a key 24 so that, as the output shaft 20 rotates, the screw shaft 21 is forced to rotate but it can slide along the shaft 20. The screw shaft 21 passes through a nut 25 which is mounted in a bored bracket 26 and held in position therein by means of a set screw 27. The bracket 26 is secured to the base 11 by means of screws 28.

On the reduced portion 22 is the cup-shaped wheel 10 which has a central hole as is usual and in the central hole is a bushing 30 which snugly fits the reduced portion 22. Also on the reduced portion 22 are plates 31 and 32 having holes therein fitting the reduced portion and the assembly of wheel 10, plates 31 and 32 is held against the screw shaft 21 and locked for rotation therewith by means of a nut 35 on the threaded end 23 and a washer 36.

It will now be seen that when the output shaft 20 rotates, the screw shaft 21 rotating with it is forced to advance or retreat along the shaft 20 on account of the engagement of the threads of the screw shaft 21 with the threads of the nut 25 which is stationary. Limit of movement is set by engagement of the plate 32 with the nut 25 and by engagement of a nut 40 with the nut 25, the nut 40 and a similar nut 41 constituting a pair of adjustable lock nuts for this purpose.

The motor 12 is a reversible motor so that the screw shaft 21 can be rotated in either direction. Means for driving the motor 12 in either direction is diagrammatically illustrated in Figure 4 involving a positive power line 51, a negative power line 52, a pair of connected switch arms 53 and 54 and switch terminals 55, 56, 57 and 58. The terminal 55 is connected by a line 61 to a motor armature input lead 62 to which also the terminal 58 is connected. The terminal 56 is connected to motor armature input lead 63 as is also the terminal 57 by a line 64. Without further description it will readily be seen that the motor armature of the motor 12, not shown, is energized with current flowing in one direction, namely with the input lead 63 positive if the switch arms 53 and 54 are down and is connected with the current flowing in the opposite direction, namely with the input 62 positive if the switch arms 53 and 54 are up. With the field of the motor 12 excited by permanent magnets or by a shunt line in which the current is always flowing in the same direction, the motor will then be reversible. The foregoing is simply illustrative of a reversible motor and any type thereof can be used.

Still referring to Figure 4, extending upwardly from the base 11 are brackets 70 and 71 through which extends a long bolt 72 having a nut 73 and a washer 74 thereon to secure it in place. A spool 75 having flanges 76 is rotatably supported by the bolt 72. This spool 75 carries yarn 80 the nature of which will presently be described. The yarn 80 runs from the spool 75 through a downwardly inclined pipe 81 and under a roller 82 to an upwardly inclined pipe 83 whence it extends to the grinding wheel 10 and is wound thereon by the rotation thereof. The pipes 81 and 83 are mounted in a liquid container 85 which is secured by screws 86 to the base 11 and they lead the yarn from outside through the liquid in the container and then out of it again. Thereby the yarn 80 is coated with resin the nature of which will be further described.

In order to wind the yarn onto the grinding wheel 10 with tension, I provide a brake comprising a brake lever 90 mounted on a pivot bolt 91 secured to the bracket 71. Weights 92 are hung on the arm 90 by a hook scale pan device 93 such as used for platform scales. The lever 90 is shaped on the under side to bear against the flange 76 and thereby tension is created on the yarn 80 as it is wound onto the wheel 10.

I have used for the yarn 80 glass yarn made up of 204 ply filaments each filament being fifteen thousand yards to the pound, the filament being continuous filament as distinguished from spun yarn. The average diameter of this yarn was .0446 inch. The feed of the wheel 10 due to the screw 21 and nut 25 was calculated to lay the yarn 80 on the wheel 10 helically with substantially no gaps between the turns of the yarn. To start the winding the end is underlapped as indicated in Figures 2 and 4 and then it suffices to energize the motor 12 in the proper direction.

The resin used was liquid polyester resin from Naugatuck Chemical Company catalyzed by 2% by weight of benzoyl peroxide dissolved in an equal weight of acetone and identified as Vibrin 114. About 50% resin by weight was put on the yarn. However, within the scope of the invention any resin may be used. This resin was cured after winding by a bake extending to 110° C. for 75 minutes but cold setting resins could be used. When the winding is completed it suffices to cut the yarn as the resin is sticky enough to hold the last turn in place. I have shown the wheel 10 substantially completely covered with wound yarn 80 but in many cases partial winding will suffice.

The wheel 10 of Figures 1 and 2 is a taper cup wheel well known in the abrasive art but other cup wheels can be effectively covered in accordance with the invention. In Figure 3 I show a straight cup wheel 10a having a bushing 30a wound with the same yarn 80.

The amount of weight 92 to put into the scale pan 93 is not critical. So long as a weight of the order of one pound but preferably more is provided a tight enough winding can be secured. It will be clear to textile men that as the diameter of the contents of the spool 75 decreases the tension on the yarn 80 is increased if the same weight is kept in the scale pan 93 but even this is not critical and adjustment does not have to be made. In general it is a good idea to provide more weight than is necessary for the maximum diameter of the yarn on the spool 75. About the only thing that could happen would be for the yarn to break or the motor to stall. The former would require unreasonable weight and with reduction gearing the latter also. Therefore weights of ten or fifteen pounds in the scale pan 93 is a good rule to follow.

One important feature of this type of reinforcement is that it acts as a guard against cracked wheels flying apart while running at operating speed. This feature was demonstrated by four tests run on flaring cup wheels six inches in maximum diameter, four and three-quarters inches in minimum diameter by two inches overall thickness measured normal to the face of the wheel with a seven-eighths inch central hole, a one inch rim and a three-quarters inch thick back 95. These wheels were aluminum oxide, 16 grit size, bonded with phenolic resin bond. The above shape is considered to be a very weak shape. The operating speed was 9,500 surface feet per minute, all wheels were the same so far as good manufacturing practices could make them.

Test No. 1 consisted in winding one of these wheels broken diametrically in two with the glass yarn described. After winding the broken wheel it was run in a centrifugal test to breakage. The wheel did not break until a speed of 18,300 surface feet per minute was reached. These wheels were completely wound with the glass yarn, that is from the face to the remote side of the back 95 of the wheel as illustrated in Figure 2.

The second test was the same as the first except that the broken wheels were wound only three-quarters of the way or one and a half inches up the periphery from the back side. The breaking speed of these wheels was 16,200 surface feet per minute.

The third test consisted in cutting wide notches in the rim that were equidistant from each other and extended to the front part of the back of the wheel. Each notch was 5/32 inch wide. These wheels were then wound with the same yarn over the entire periphery and then broken in the centrifugal test. The breaking speed was 18,600 surface feet per minute.

The fourth test was made to determine the ultimate cross breaking strength of the wheel. The taper cup wheel was placed on a Carver hydraulic press supported on its grinding face by two rectangular steel bars. A single rectangular bar one-quarter of an inch thick was placed diametrically across the back of the wheel. The press was closed and the pressure exerted until a maximum reading was obtained. This was done with a glass yarn wound wheel as above described and also with an unwound wheel. The former had a breaking strength of 8,000 pounds and the latter a breaking strength of only 2,500 pounds.

Insomuch as wheels are made in all sizes and out of all kinds of materials, it is impossible to specify the size, called count, of the yarn to be used. So long as it is continuous filament glass yarn any reasonable size can be used. Naturally if it is too fine the strength added to the wheel will not be too great. Also if it is too coarse it might not be easily securely cemented to the wheel by the resin and further may not hug the wheel closely enough to be effective. But within reasonable limits any size of yarn can be used and by indicating the size of wheels tested and the size of yarn used to wind them I have given the best practical example of the invention now known to me.

It is surprising that the yarn doesn't fly off of the wheels in use, because centrifugal force is exerting a very strong force against the end of the last turn to pull it away from the wheel and very probably the resin cannot resist this force unaided. The answer is the slip stream of air which tends to hold the end of the last turn in place and the winding holds the other turns in place. Therefore wheels according to the invention should be rotated in the direction opposite to that in which the end of the last turn points. The end of the last turn is indicated at 100 in Figure 2 and therefore the wheel should be rotated counterclockwise, Figure 1, as Figure 1 is a view made by turning the wheel of Figure 2 perpendicular to its axis 90 degrees to the right and 100 therefore points in the opposite direction from the rotation of the wheel. The rotation of the wheel 10 is indicated in Figure 1 by the long arrow and the direction in which the end of the last turn points is shown by the small arrow in Figure 1.

In grinding the end 100 is continually being eroded away. Being glass yarn it has an abrasive action so it does not interfere with the grinding which is done on the annular face 101 opposite the back 95 of Figure 2 or the annular face 101a opposite the back 95a of Figure 3.

It will thus be seen that there has been provided by this invention cup shaped grinding wheels in which the various objects hereinabove set forth together with many practical advantages are successfully achieved. As many possible embodiments may be made of the above invention and as many changes might be made in the embodiment above set forth, it is to be understood that all matter hereinbefore set forth or shown in the accompanying drawings, is to be interpreted as illustrative and not in a limiting sense.

I claim:

1. A cup shaped grinding wheel having, on the periphery thereof, a plurality of turns of a continuous winding of yarn, said winding extending from a starting end through the plurality of helical turns to the end of the last applied turn, and resin impregnating said yarn and holding the turns to said periphery of said wheel, with the starting end tucked under the adjacent turn of the winding.

2. A grinding wheel according to claim 1 in which the end of the last applied turn is free apart from the holding thereof by the resin.

3. A grinding wheel according to claim 2 in which the yarn is continuous filament glass yarn.

4. A grinding wheel according to claim 3 in which the resin is thermo set resin.

5. A grinding wheel according to claim 1 in which the yarn is continuous filament glass yarn.

6. A grinding wheel according to claim 5 in which the resin is thermo set resin.

7. A grinding wheel according to claim 1 in which the resin is thermo set resin.

8. A grinding wheel according to claim 7 in which the end of the last turn is free apart from the holding thereof by the resin.

References Cited in the file of this patent

UNITED STATES PATENTS

| | | |
|---|---|---|
| 2,028,183 | Benner et al. | Jan. 21, 1936 |
| 2,250,580 | Gregory | July 29, 1941 |